United States Patent

Kempf et al.

Patent Number: 5,554,577
Date of Patent: Sep. 10, 1996

[54] AGENTS FOR THE STIMULATION AND CULTIVATION OF PLANT GROWTH AND PROCESS FOR PRODUCING SAID AGENTS

[75] Inventors: Wolfgang Kempf, Dormagen; Peter Schroeder, Viersen; Wolfgang Ritter; Bernd Ebbe, both of Haan, all of Germany

[73] Assignee: Henkel Kommanditgesellschaft auf Aktien, Duesseldorf, Germany

[21] Appl. No.: 307,595

[22] PCT Filed: Mar. 18, 1993

[86] PCT No.: PCT/EP93/00646

§ 371 Date: Oct. 13, 1994

§ 102(e) Date: Oct. 13, 1994

[87] PCT Pub. No.: WO93/19023

PCT Pub. Date: Sep. 30, 1993

[30] Foreign Application Priority Data

Mar. 20, 1992 [DE] Germany ............... 42 09 014.8

[51] Int. Cl.⁶ .................................................. A01N 25/10
[52] U.S. Cl. .................... 504/116; 71/DIG. 1; 71/64.13; 414/488; 414/499; 514/778
[58] Field of Search ................... 504/116; 71/DIG. 1, 71/64.13; 424/488, 499; 514/778

[56] References Cited

U.S. PATENT DOCUMENTS

| | | | |
|---|---|---|---|
| 3,451,800 | 6/1969 | Hudson et al. | 71/12 |
| 4,911,952 | 3/1990 | Doane et al. | 427/213.31 |
| 5,183,690 | 2/1993 | Carr et al. | 427/213.31 |

FOREIGN PATENT DOCUMENTS

| | | |
|---|---|---|
| 2607347 | 9/1976 | Germany . |
| 3229954 | 2/1984 | Germany . |
| 3247917 | 6/1984 | Germany . |
| 3405521 | 8/1985 | Germany . |
| 3739088 | 6/1989 | Germany . |
| 4038732 | 6/1992 | Germany . |
| 4121111 | 1/1993 | Germany . |
| 3008787 | 1/1991 | Japan . |
| WO9103940 | 4/1991 | WIPO . |

OTHER PUBLICATIONS

R. F. T. Stepto et al., "Injeciton Moulding of Natural Hydrophillic Polymers in the Presence of Water", *Chima 41*, (1987), No. 3, pp. 76–81.

*Primary Examiner*—S. Mark Clardy
*Attorney, Agent, or Firm*—Wayne C. Jaeschke; J. Daniel Wood; Daniel S. Ortiz

[57] ABSTRACT

The subject matter comprises shaped mixtures of valuable materials for the stimulation and cultivation of plant growth, said materials containing plant nutrients and/or plant-protective agents in admixture with a thermoplastic binder. According to the invention the mixtures of valuable materials, which mixtures have in particular been shaped as fertilizer rods, are characterized in that they contain, as the binder, a starch that has been thermomechanically digested at elevated pressures and temperatures.

The invention further relates to the process for producing these multi-component mixtures and to the use of thermomechanically digested starch, optionally in admixture with inferior amounts of further biologically compatible binder components, as a biologically degradable binder for mixtures of valuable materials of the type described.

28 Claims, No Drawings

5,554,577

AGENTS FOR THE STIMULATION AND CULTIVATION OF PLANT GROWTH AND PROCESS FOR PRODUCING SAID AGENTS

This application has been filed under 35 USC 371 as a continuation of PCT/EP 93/00646, filed Mar. 18, 1993.

BACKGROUND OF THE INVENTION

1. Field of Invention

The invention relates to shaped fertilizers which may be in the form of powders, granules, but more specifically in the form of so-called fertilizer rods, and which contain plant nutrients together with a biocompatible and biodegradable thermoplastic binder. The invention is hereinbelow described substantially by way of the mixtures of valuable substances shaped as fertilizer rods while it is not restricted to this shape.

2. Discussion of Related Art

Fertilizer rods are employed in the home and garden area mainly for fertilizing pot plants. The fertilizer rods are stuck or pressed into the soil in order to provide the earth surrounding the plants with the required nutrients. Thereby it is possible to supply an easily and accurately metered amount of fertilizer. Also the release rate of the nutrient may be controlled by means of the amount of binder incorporated. Other marketing forms of such shaped fertilizers include pins, nails or wedges. For large area application of predetermined nutrient mixtures having a controlled release rate, the marketing forms as initially mentioned of powders and/or granules may offer possibilities of an easy handling in practice.

With view to prior art, reference is made, for example, to DE-C2-32 29 954, DE-A1-32 47 917 and DE-C2-34 05 521 and to the additional pertinent material of prior art cited in these printed publications.

Fertilizer rods contain complex mixtures of inorganic and, optionally, organic components which are capable of providing the elements required for plant growth—either with some retardation or with direct onset of activity, according to one's choice. The elements to be taken into consideration include, more particularly, N, P, K, Ca, Mg, Fe, Mn, Zn, Cu, Mo, B, Co, S and Na. Sustained-release nitrogen depot fertilizers have been selected, for example, from organic nitrogen compounds such as urea-formaldehyde condensate or crotonylidene-diurea, whereas ammonium, nitrate and amide nitrogen compounds are among the quick-acting constituents. Ammonium, potassium, magnesium and calcium phosphates that are soluble in water, ammonium nitrate and mineral acid have proven to be useful for supplying the plants with phosphate. Potassium is employed, for example, in the form of $K_2SO_4$ or KCl, but potassium magnesium sulfate is also suitable. Magnesium may be employed in the form of various sulfate salts. Suitable further components of the mixtures are, for example, ammonium molybdate, zinc sulfate as well as boric acid. Suitable organic components that may be used as nutrients and/or as aggregates or fillers are peat, biomasses from bacteria and fungi, urea, horn shavings, horn meal, blood and bone meal, seaweed powder and the like. Also, further important constituents may further be plant-protective agents for reducing the undesired infestation of the plants with pests and/or pathogens. Further conventional aggregates to the agents of the type here involved are, for example, colorants and odorous substances, lubricants, inhibitors to urease and nitrification as well as quite simply fillers, for example sand.

The complex mixtures comprising the active substances of plant nutrients and plant-protective agents are intimately mixed with a thermoplastic binder which is usually water-soluble and, in this form, are shaped, for example into rods. The binder does not only serve the purpose of providing the complex mixture of the valuable materials with some stable form, but it may also affect the release characteristics of the respective shaped articles in practical use.

The binders hitherto employed—hereto cf. the literature cited in the introduction and the secondary literature mentioned therein—are synthetic or semi-synthetic polymer compounds, among which particular importance in practice is attached to polyethyleneglycol, polyvinyl pyrrolidone, carboxymethyl cellulose and, especially, polyvinyl alcohol.

It is the object of the teaching of the invention described hereinbelow, in substance mixtures of the type described here to employ a binder that has not been used hitherto. This binder is intended not only to be inexpensive and available in any desired amount, but it is also to provide all advantages in the manufacture of the shaped article, especially those having the shape of fertilizer rods. The dry forms of the final commercial material are to be sufficiently inert in the presence of the air and of the moisture present in the air under conditions of practice, so that any interferences with practical use, for example by that the material becomes tacky, undergoes changes in strength and the like, will not occur. Nevertheless, the invention wants to provide a binder which is not only biologically compatible, but which also can be designated as an additional valuable material itself.

The teaching according to the invention has been based on the observation that a thermomechanically digested and, thus, thermoplasticized starch is capable of satisfying this catalogue of a variety of objects.

SUMMARY OF THE INVENTION

Accordingly, in a first embodiment the invention relates to shaped mixtures of valuable materials for the stimulation and cultivation of plant growth, which materials contain plant nutrients and/or plant-protective agents in admixture with a thermoplastic binder. The mixtures of valuable materials according to the invention are characterized in that they contain, as the binder, a starch that has been thermomechanically digested at elevated pressures and temperatures.

The invention, in a further embodiment, relates to the process for producing said shaped mixtures of valuable materials, which process is characterized in that native starch is admixed with said valuable materials, if desired, with further amounts of water, and/or lower molecular weight plasticizing agents, the multi-material mixture is subjected to a starch digestion at elevated temperatures and pressures with simultaneous intense mixing and/or kneading to form a thermoplastically processable starch and, if desired, the homogenated material mixture is shaped.

The invention eventually relates to the use of a thermomechanically digested starch, optionally in admixture with inferior amounts of furth biologically compatible binder constituents, as a biologically degradable binder for mixtures of valuable materials for the stimulation and cultivation of plant growth.

DETAILED DESCRIPTION OF THE INVENTION

Numerous recent proposals deal with the attempt of opening up an extended range of possible fields of application to high molecular weight polymer compounds of natural origin—and especially to starch, among these. All of this work has been based on the recognition that native starch, together with limited amounts of water and/or further auxiliary materials, by means of a thermomechanical digestion can be converted into a thermoplastic material that can be processed in a conventional manner, for example by a shaping extrusion. The thermomechanical digestion by employing elevated temperatures and pressures is possible, more specifically, in conventional extruders provided upstream of the shaping step. From the comprehensive literature, here particular reference may be made to the publication by R. F. T. Stepto et al., Injection Moulding of Natural Hydrophilic Polymers in the Presence of Water, Chimia 41 (1987), No. 3, 76–81, and the literature quoted therein.

Continuing work—also by Applicants—has been directed to the investigation of the possibility of incorporating other polymer compounds of synthetic origin in the thermoplasticized starch in order to obtain definite material properties—and especially a deliberate adjustability of the water strength. Reference is made to Applicants' older applications DE-A-40 38 732 and, more particularly, DE-A-41 21 111. This last-mentioned older patent application describes the concomitant use of synthetic thermoplastic polymer compounds which have been at least partially composed of key substances based on re-growable raw materials in admixture with the thermoplasticized starch. The disclosure of Applicants' said applications for protective rights is herewith incorporated by reference in the subject matter of the disclosure of the present invention.

The nub of the teaching according to the invention is the fact now found of that starch which has been thermomechanically digested and, hence, thermoplasticized, is quite particularly suitable as a binder in fertilizer rods of the kind described in the earlier literature as initially cited and in corresponding solid marketing forms as more or less finely divided of such mixtures of valuable materials for promoting and protecting plant growth.

The thermoplasticized starch is not only a valuable material which—derived from native starch—is inexpensively available in unlimited quantities; the thermoplasticized starch, in admixture with the material mixtures involved according to the invention which are inorganic and organic in nature also proves to be a binder which in an optimal manner suits the requirements in manufacture, storage and use of the shaped fertilizer mixtures. Limited amounts of the thermoplasticized starch are sufficient to form fertilizer rods of conventional composition and having high strength. The fertilizer rods according to the invention are virtually inert to air and to the moisture associated therewith. Also upon storage in the open air over an extended period of time, the surface of the fertilizer rod does not become tacky. The strength as adjusted of the fertilizer rod does not change. If, on the other hand, the fertilizer rod is forced into the moist soil, then the situation with respect to the part in contact with the soil of the fertilizer rod undergoes a rapid change: The part surrounded by the moist soil of the fertilizer rod is softened, digested, the valuable materials providing the fertilizing and/or plant-protecting effects are released and are enabled to display their functions. Here, the following facts, among others, are crucial: The portion of the fertilizer rod still exposed to the air retains its strength virtually unchanged; that is, depending on the degree of requirement, it may be continued to be stepwise forced into the planting soil. The portion of the starch present in the soil, as a natural product, is accessible to the soil-inherent and plant-endogenous metabolism and thereby becomes a valuable material itself. By the particular embodiment of the thermomechanical process of the starch digestion, a substantial influence can be exerted on the nature of the thermoplasticized starch, for example with view to a more brittle or more solid key structure of the multi-component material. Thereby, for example, influence may be exerted on a possibly desired secondary processability of the primary shaped articles. This may be understandable from the following: If the mixtures of valuable materials are intended for application over a wide area, then the respective desired marketing form may be more readily adjusted by grinding or comminuting in the dry and/or cold condition, respectively, than would be the case by a reduction in size of a material mixture adjusted to have a fertilizer rod quality according to the invention. The modifiability of the material properties in the thermomechanically digested starch and, optionally, the concomitant use as already mentioned of further binder components provides the possibility of exerting an influence onto a controlled release over the time of the valuable materials affecting the plant growth.

The preparation of the thermoplasticized starch by thermomechanical digestion is effected in the manner described in Applicants' mentioned older applications wherein in turn reference has been made to pertinent prior art—for example to the publication initially cited by R. F. T. Stepto et al. Accordingly, the starch is thermoplasticized with the concomitant use of restricted amounts of water and/or lower molecular weight plasticizing agents by processing at elevated temperatures and pressures. For the purpose according to the invention, an addition of extraneous water is usually unnecessary. The intrinsic water content of starch is known to be within the range of about 15–20% by weight. For the purpose of use according to the invention, this water content is also sufficient. Nevertheless it is expedient to additionally employ a plasticizing agent of the type described above. For the procedure according to the invention there are to be taken into consideration, more particularly, biologically compatible plasticizing agents of the type mentioned, including in the first place the class of the lower polyfunctional alcohols and/or ethers thereof. A particularly well suitable plasticizing agent, under considerations of both its technical functionality and its compatibility in practical use in the soil, is glycerol.

The multi-material mixtures described according to the invention, especially the fertilizer rods, usually contain the thermomechanically digested starch in amounts of from about 10 to 40% by weight, and preferably of from about 15 to 30% by weight— % by weight in each case relative to the total weight of the multi-component material. As a balance, the usual plant-active materials or material mixtures are present, optionally in admixture with auxiliary materials such as fillers, lubricants, colorants and odorous substances and the like. Explicit reference is made to the relevant printed published state of the art and, more particularly, to the German Patent Specifications on the area of fertilizer rods as initially mentioned.

As fertilizer rods, the shaped materials formed according to the invention may have a diameter of, for example within the range of from about 2 to 20 mm, while the lengths thereof are usually within the range of from about 20 to 200 mm. For a use as fertilizer rods, operation conditions in the manufacture of the shaped material are preferred which result in comparably high values of the flexural strength of the solid material. Suitable values of the flexural strength are, for example, at least about 3,000 N/cm$^2$, while these values may be distinctly higher as well. Lower strength values may be suitable for the use as powders and/or granules.

The process according to the invention of producing the shaped articles, in a preferred embodiment, is characterized by the combination of the two partial step of, on the one hand, mixing the materials and, on the other hand, thermomechanical digestion of the starch, on the other hand, to form one integrated operation. To this end, the native starch, the further auxiliary agents needed for digesting the starch, especially the lower molecular weight plasticizing agents, and the plant-nutritive and -protective agents are added, separately or, if desired, in partial admixture, into a suitable mixing and processing device. Suitable are especially those devices which have been described earlier in the literature for the thermoplastic digestion of starch with water and/or lower organic auxiliary components. Accordingly, the step of starch digestion is carried out in closed kneaders or, preferably, in extruders. Therein, the residence time and the processing conditions are mutually adjusted so that the thermomechanical starch digestion as well as the desired formation of a homogeneous mixture of all of the components are ensured.

The individual components of the mixture may be supplied continuously to the respective employed working device, for example to the extruder, in the feed region thereof in the amount required. In the course of the transportation of the multi-component mixture through the extruder, the desired process of homogenation and mixing takes place in the front (upstream) compartments. The following part of the processing path is maintained under product temperatures and pressures producing the desired thermomechanical starch digestion. Herein, the product temperatures usually are at least about 90° C., and preferably within a range of from about 90° C. to 120° C. If so desired and in cooperation with the components of the mixture employed altogether, higher working temperatures may also be employed. One pre-requisite therefor is that said thermal action causes no damage or no substantial damage to the valuable materials for stimulation and/or protection of plant growth. The employed working pressure usually conforms to the intrinsic pressure of the water-containing material mixture at the pre-determined working temperature, but it may be controlled by the extruder operation in a per se known manner. Suitable extruders are single-screw extruders or preferably multiple-screw extruders as those described in the state of the art of producing the fertilizer rods as hitherto known.

The residence times of the multi-material mixture under the working conditions in general are not more than a maximum of about 30 minutes; preferably, they are distinctly shorter. It may be appropriate to employ residence times of the multi-material mixture at least within the range of the temperature and pressure conditions for starch digestion of about from 0.5 to 10 minutes, and preferably within a range of up to about 5 minutes.

The starch to be employed in the process may be of any origin. Starch sources such as potatoes, corn, rice, the usual cereals and the like may be mentioned in the first place here. The starch is generally employed in powder form. If so desired, it may be subjected to pre-treatments such as a partial drying, an acid washing and/or further pre-treatments, especially in order to physically modifying the starch. As a rule, however, this will not be required for the work area according to the invention. The water content of the starch feedstock, being especially of native origin, may vary within a wide range and often is within the range of from about 10 to 25% by weight.

The thermomechanical digestion of the starch is substantially promoted in a per se known manner by the concomitant use of lower organic plasticizers. In this context to be considered are, more specifically, compounds from the group of lower polyfunctional alcohols such as ethyleneglycol, propyleneglycol, butanediol, especially glycerol as already mentioned.

The lower molecular weight plasticizers are appropriately used in amounts of from about 5 to 30% by weight, and preferably in amounts of from about 15 to 30% by weight, — % by weight here relative to the water-containing starch. It is further preferred that the total content of water and lower organic plasticizers is selected to be within the range of from about 25 to 55% by weight, and preferably in amounts of from about 35 to 50% by weight, — % by weight here relative to the sum of anhydrous starch, water and lower plasticizers. As has already been set forth above, the fillers for the stimulation and protection of plant growth amount to more than half of the total weight of the fertilizer rod; the contents of these compounds usually are at least about 60% by weight, and especially about 70 to 80% by weight.

If the concomitant use of further binders is desired in addition to the thermoplasticized starch, then any auxiliary material is basically suitable unless it threatens the intended use, including especially appropriate polymer compounds. The use of polymer components based on natural products, for example those within the scope of Applicants' application DE-A-41 21 111 as already mentioned above, may be particularly expedient. Here, synthetic thermoplasts from the classes of polyesters and/or polyamides are described as polymeric mixture components, which have been at least partially composed of key substances based on re-growable raw materials.

The quality of the surface of the fertilizer rods produced according to the invention—smooth, rough or porous surface—can be controlled towards any desired direction through the process parameters maintained during extrusion. More particularly, the surface quality may be controlled through the temperature and the working pressure in the extruder.

Interestingly, it has been found that even fertilizer formulations comprising a high amount of strong oxidants—for example $KNO_3$—can be incorporated in the fertilizer rods defined according to the invention to provide products which are decomposition-resistant.

In Example 1 of the following examples, mixing of the valuable materials and processing same with simultaneous thermoplastication in a screw extruder is described.

Further formulations were prepared and processed in accordance with the specifications of Example 1. The results thereof are summarized as Examples 2 through 13 in a Table. No starch was added to the batch in the subsequent Comparative Example 14 set forth in this Table.

EXAMPLES

Example 1

System: Potato starch/glycerol

A fertilizer rod was produced from thermoplastic starch and a fertilizer composition by coextrusion of 9 kg/h of a mixture comprising fertilizer and potato starch (ratio of 7:2) with 1 kg/h of glycerol using an extruder of the following specifications:

| Extruder | Werner & Pfleiderer; Continua 37 |
|---|---|
| Mode of operation | Twin screw extruder; screws rotating in the same direction |
| Screw diameter | 37 mm |
| Length | 30 D |
| Torque per shaft | 90 Nm |
| Driving power | 9.5 kW |

The solid and liquid compounds are metered and added unmixed at different locations into an unheated feed zone. First, the solid powdery potato starch/fertilizer mixture is supplied through a metering screw. Slightly downstream thereof (1 D), the glycerol is added while metered through an eccentric screw pump from the top into the extruder.

The solid and liquid phases are throroughly mixed in the following mixing zone to form a homogeneous mixture. In order to effect simultaneous heating, the extruder is heated from outside (temperature of the heating medium: 88° C.) at a length of from 5 D to 12 D. In the second half of the extruder there is performed a thermomechanical digestion of the starch by the glycerol and the water contained in the starch, said digestion resulting in a plastication of the material. Simultaneously, the thermoplastic starch present in the molten state is mixed with the fertilizer.

The energy input is effected by both external heating and intensive mechanical treatment with the kneading elements. The heating medium temperature over the length of from 13 D to 25 D is 92° C. The thermoplastic material is forced through an extrusion die having ten orifices of 5 mm in diameter each, whereby the material is obtainable in the form of flexible strands. These strands are cooled on a cooling conveyor belt or in the air and then cut into pieces of about 5 cm in length.

The first half of the extruder contained two left hand-rotating backmixing members each being 10 mm in length in addition to the usual conveyor members. The second half of the extruder comprised two kneading elements each 40 mm in length in addition to the usual conveyor members. The last 4D of the screw comprised advancing members having an increased pitch in order to generate higher pressures in front of the die. At this place there were also available venting means.

The process parameters to be pre-set on the extruder, the quantities to be measured as ensuing therefrom and the composition of the raw material mix is evident from the following survey:

| | Extrudate production |
|---|---|
| Composition of the raw material | 70.0% of fertilizer mixture<br>20.0% of potato starch<br>10.0% of glyceral |
| Extruder | W & P, C 37 (2o D) |
| Throughout | 10 kg/h |
| Temperature of heating medium | |
| First half | 88° C. |
| Second half | 92° C. |
| Discharge temperature | 97–98° C. |
| Rate of rotation | 100 rpm |
| Torque | 58% of maximum |
| Residence time | from 50 seconds to 4 minutes |
| Appearance | bright green, opaque, no bubbles, smooth surface |
| Mechanical properties | flexible |
| Tackiness | no |
| Remark | no venting |

A typical fertilizer mixture is composed as follows:

| | |
|---|---|
| 20% | of urea-formaldehyde condensate |
| 15% | of potassium nitrate |
| 15% | of potassium sulfate |
| 18% | of ammonium sulfate |
| 14% | of ammonium dihydrogen phosphate |
| 8% | of dicalcium phosphate |
| 5% | of magnesium sulfate |
| 0.37% | of boric acid |
| 0.01% | of ammonium molybdate |
| 0.32% | of manganese sulfate |
| 0.5% | of EDTA-Fe |
| 0.25% | of EDTA-Cu |
| 0.06% | of zinc sulfate |
| 3.49% | of limestone meal |

TABLE

| | Formulation | | | | Product composition | | |
|---|---|---|---|---|---|---|---|
| | Solids added | | | Glycerol | | | |
| Example | Potato starch % by weight | Fertilizer mixture % by weight | Amount kg/h | added kg/h | Fertilizer % by weight | Starch % by weight | Glycerol % by weight |
| 2 | 22.2 | 77.8 | 9.0 | 0.9 | 70.7 | 20.2 | 9.1 |
| 3 | 22.2 | 77.8 | 9.0 | 0.8 | 71.4 | 20.4 | 8.2 |
| 4 | 22.2 | 77.8 | 9.0 | 0.7 | 72.2 | 20.6 | 7.2 |
| 5 | 22.2 | 77.8 | 9.0 | 0.6 | 72.9 | 20.8 | 6.3 |
| 6 | 22.2 | 77.8 | 9.0 | 0.5 | 73.7 | 21.0 | 5.3 |
| 7 | 18.2 | 81.8 | 9.0 | 1.0 | 73.6 | 16.4 | 10.0 |
| 8 | 18.2 | 81.8 | 9.0 | 0.9 | 74.4 | 16.5 | 9.1 |
| 9 | 18.2 | 81.8 | 9.0 | 0.8 | 75.1 | 16.7 | 8.2 |
| 10 | 18.2 | 81.8 | 9.0 | 0.7 | 75.9 | 16.9 | 7.2 |
| 11 | 18.2 | 81.8 | 9.0 | 0.6 | 76.7 | 17.0 | 6.3 |
| 12 | 18.2 | 81.8 | 9.0 | 0.5 | 77.5 | 17.2 | 5.3 |
| 13 | 40.4 | 60.0 | 6.0 | 1.0 | 50.5 | 33.3 | 16.7 |
| 14 | 0 | 100 | 9.0 | 1.0 | 90.0 | 0 | 10.0 |

TABLE-continued

| | Extrusion parameters | | | | | | | | |
| | Temperature of heating medium | | Rate of | | Discharge temperature (extruder | | | | |
| Example | First half °C. | Second half °C. | rotation min⁻¹ | Torque % | measurement) °C. | Color | Strength | Surface | Tackiness |
|---|---|---|---|---|---|---|---|---|---|
| 2 | 100 | 100 | 100 | 58 | 88–92 | bright green | flexible | smooth | no |
| 3 | 96 | 99 | 100 | 56 | 98–101 | bright green | flexible | smooth | no |
| 4 | 90 | 90 | 100 | 58 | 101–106 | bright green | flexible | smooth | no |
| 5 | 90 | 90 | 100 | 59 | 102–104 | bright green | good | smooth | no |
| 6 | 90 | 90 | 100 | 61 | 102 | bright green | very good | smooth | no |
| 7 | 90 | 90 | 100 | 60 | 102 | bright green | flexible | roughened | no |
| 8 | 90 | 90 | 100 | 64 | 92 | bright green | flexible | roughened | no |
| 9 | 90 | 90 | 100 | 62 | 97 | bright green | poor | roughened | no |
| 10 | 90 | 90 | 100 | 60 | 97 | bright green | poor | very rough | no |
| 11 | 90 | 90 | 100 | 58 | 100 | bright green | poor | very rough | no |
| 12 | 90 | 90 | 100 | 64 | 103 | bright green | poor | very rough | no |
| 13 | 90 | 90 | 100 | 30 | 98 | bright green | very flexible | smooth | no |
| 14 | 90 | 90 | 100 | 40 | 98 | green | falls apart | very rough | no |

We claim:

1. An article of manufacture comprising a shaped mixture comprised of a plant-active material for the stimulation or cultivation of plant growth, said plant-active material containing a member selected from the group of plant nutrients, plant-protective agents, and mixtures thereof, in admixture with a thermoplastic binder consisting essentially of a starch which is the product of thermomechanical digestion at elevated pressures and temperatures of a mixture comprising starch and water, said starch being present in an amount of from about 10 to 30% by weight of said shaped mixture and at least 60% by weight of said shaped mixture of the plant-active material.

2. An article as claimed in claim 1 wherein said starch is the product of thermoplasticizing with the concomitant use of restricted amounts of a member selected from the group consisting of water, lower molecular weight plasticizing agents, and mixtures thereof.

3. An article as claimed in claim 2 wherein said lower molecular weight plasticizing agent is selected from the group consisting of compatible lower polyfunctional alcohols.

4. An article as claimed in claim 1 wherein said starch is present in an amount of from about 15 to 30% by weight of said shaped mixture.

5. An article as claimed in claim 1 wherein said shaped mixture is further comprised of an auxiliary material selected from the group consisting of fillers, lubricants, colorants, odorous substances, and mixtures thereof.

6. An article as claimed in claim 1 wherein said shaped intimate mixture is in the form of a powder.

7. An article as claimed in claim 1 wherein said shaped intimate mixture is in the form of granules.

8. An article as claimed in claim 1 wherein said shaped intimate mixture is in the form of fertilizer rods.

9. An article as claimed in claim 1 wherein said article is at least largely stable in shape and non-tacky upon exposure to the ambient atmosphere, while upon contact with soil, and especially when embedded in the soil, said article releases said plant-active valuable material.

10. An article as claimed in claim 9 wherein said release from said article is with a simultaneous degradation of said starch.

11. An article as claimed in claim 1 wherein said article is the product of mixing a water-containing starch with said plant-active material, followed by thermoplastication of the water-containing starch upon the addition of minor amounts of biologically compatible plasticizers, followed by shaping.

12. An article as claimed in claim 11 wherein said biologically compatible plasticizer is glycerol.

13. An article as claimed in claim 1 wherein said mixtures have been shaped as fertilizer rods with diameters of about from 2 to 20 mm and lengths within a range of about from 20 to 200 mm.

14. An article as claimed in claim 1 wherein said fertilizer rods have flexural strengths of at least 3,000 N/cm².

15. A process for producing shaped mixtures of plant-active materials for the stimulation and cultivation of plant growth, said process comprising:

mixing native starch containing water with plant-active materials and a lower molecular weight plasticizing agent wherein the amount of plasticizing agent is from about 5% to 30% by weight of the starch and water, and wherein the water and plasticizing agent are present at from about 25% to 55% by weight of the starch, water and plasticizing agent;

subjecting the resulting mixture to thermomechanical digestion at elevated temperatures and pressures with simultaneous intense kneading to form a mixture of thermoplastically processable starch and plant-active materials wherein the mixture of thermoplastically processable starch and plant-active materials comprises at least about 60% by weight of the mixture of plant-active materials and from about 10% to about 30% by weight of thermomechanically digested starch.

16. A process as claimed in claim 15 wherein said process further comprises shaping said mixture of thermoplastically processable starch and plant-active materials.

17. A process as claimed in claim 15 wherein said mixing and subjecting are carried out in a closed kneader, wherein the residence time and the processing conditions are mutually adjusted so that a homogeneous mixture of all of the components of the mixture is ensured.

18. A process as claimed in claim 15 wherein said mixing and subjecting are carried out in a closed extruder.

19. A process as claimed in claim 15 wherein said elevated temperatures are in excess of 90° C. at least during the final phase of said subjecting step.

20. A process as claimed in claim 15 wherein said elevated temperatures are in the range of from 95° C. to 120° C. at least during the final phase of said subjecting step.

21. A process as claimed in claim 15 wherein the time of subjecting said mixture is within a range of up to 30 minutes.

22. A process as claimed in claim 15 wherein the time of subjecting said mixture is within a range of from about 0.5 to 10 minutes.

23. A process as claimed in claim 15 wherein the subjecting of said mixture is a continuous process under the intrinsic pressure as prevailing in the system under the process temperature.

24. A process as claimed in claim 15 wherein said mixing and subjecting are carried out in heated extruders, wherein said starch is a starch powder having a natural water content, wherein said starch and the plant-active materials are fed as separate solids or as a mixture thereof, while the member selected from the group consisting of water, lower molecular weight plasticizers, and mixtures thereof, is added as a separate material stream in a feed zone, and wherein the mixture of thermoplastically processable starch and plant-active materials is recovered as an extrudate.

25. A process as claimed in claim 24 further comprising partially stripping excess water from said mixture of thermoplastically processable starch and plant-active materials.

26. A process as claimed in claim 15 wherein the strength and/or brittleness of said mixture of thermoplastically processable starch and plant-active materials, after drying, are controlled by means of the amounts of said starch employed and said member selected from the group consisting of water, lower molecular weight plasticizers, and mixtures thereof.

27. A process as claimed in claim 15 wherein said member selected from the group consisting of water, lower molecular weight plasticizers, and mixtures thereof is employed in an amount of about from 15 to 30% by weight relative to the weight of the starch and any water contained in said starch.

28. A process as claimed in claim 15 wherein the amount of said member selected from the group consisting of water, lower molecular weight plasticizers, and mixtures thereof, is within the range of about from 35 to 50% by weight relative to the sum of the weights of said starch on an anhydrous basis, water and lower molecular weight plasticizers.

* * * * *